United States Patent [19]

Merket

[11] Patent Number: 4,556,486
[45] Date of Patent: Dec. 3, 1985

[54] CIRCULATING WATER FILTERING SYSTEM AND METHOD OF OPERATION

[76] Inventor: Lesley Merket, 904 Rusk, Colorado City, Tex. 79512

[21] Appl. No.: 580,530

[22] Filed: Feb. 15, 1984

[51] Int. Cl.⁴ .............................................. E02B 9/00
[52] U.S. Cl. .................................... 210/170; 210/241; 210/411; 210/472; 210/499
[58] Field of Search ...................... 210/333.1, 499, 167, 210/170, 472, 411, 412, 241, 249, 250; 60/687

[56] References Cited

U.S. PATENT DOCUMENTS

| | | | |
|---|---|---|---|
| 211,640 | 1/1879 | Peterson | 210/340 |
| 1,751,602 | 3/1930 | Ray | 60/687 |
| 2,743,154 | 4/1956 | Kaufman et al. | 210/411 |
| 2,806,537 | 1/1954 | Sparks, Sr. | 210/170 |
| 2,828,017 | 3/1958 | Ronningen et al. | 210/102 |
| 2,885,080 | 5/1959 | Goldman | 210/411 |
| 2,954,872 | 10/1960 | Liddell | 210/108 |
| 3,056,499 | 10/1962 | Liddell | 210/108 |
| 3,169,921 | 2/1965 | Griffith | 210/170 |
| 3,670,895 | 6/1972 | Goodpasture | 210/333.01 |
| 3,675,775 | 7/1972 | Obidniak | 210/138 |
| 3,830,658 | 8/1974 | Davister | 210/333.1 |
| 3,968,834 | 7/1976 | Mangus et al. | 60/687 |
| 3,976,577 | 8/1976 | Kaiser | 210/340 |
| 3,994,810 | 11/1976 | Schaeffer | 210/103 |
| 4,021,347 | 5/1977 | Teller et al. | 210/195.4 |
| 4,081,381 | 3/1978 | Rosenmund et al. | 210/414 |
| 4,276,164 | 6/1981 | Martone et al. | 210/170 |
| 4,284,500 | 8/1981 | Keck | 210/411 |
| 4,400,273 | 8/1983 | Bastenhof | 210/284 |
| 4,484,447 | 11/1984 | Gueraud | 60/687 |

FOREIGN PATENT DOCUMENTS

| 580404 | 1/1959 | Canada | 210/411 |
|---|---|---|---|
| 1082575 | 6/1960 | Fed. Rep. of Germany | 210/411 |

Primary Examiner—Hiram H. Bernstein
Assistant Examiner—Titus B. Ledbetter, Jr.
Attorney, Agent, or Firm—Wendell Coffee; Montgomery W. Smith

[57] ABSTRACT

Circulating water for a power plant contains clams and other particles that would clog condensor tubes. Four filter units have inlets and outlets connected in parallel to a lake and the power plant, respectively. The parallel connection permits isolation of one unit for servicing while the remaining units filter the circulating water. A selected unit is isolated by blocking the inlet and outlet. A drain is opened, and backwash water is pumped to sprayers in the selected unit. Nozzles on the sprayers direct water at filter screens in the unit to wash clams and other particles collected on the screens to the drain for disposal. While the unit is thus isolated, workmen may open manholes and enter the unit interior for maintenance. The selected unit is placed online by partially opening the unit inlet to fill the unit and purge air through the open vent. When the unit is full, the vent is closed, and the inlet and outlet are fully opened. The filter units are supported by springs mounted to a concrete foundation in order to accommodate flexing of tunnels and filter units due to extremely high fluid flow rates in the units and tunnels.

3 Claims, 9 Drawing Figures

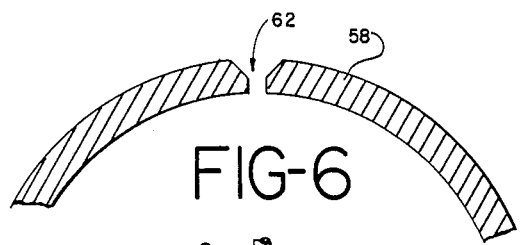
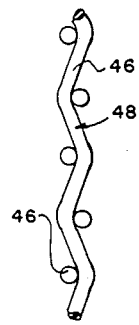
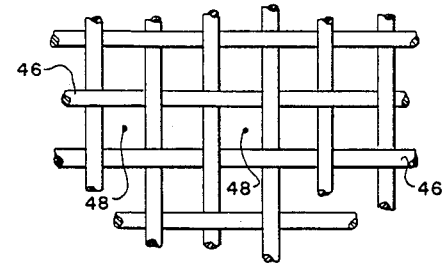
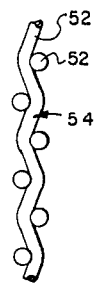
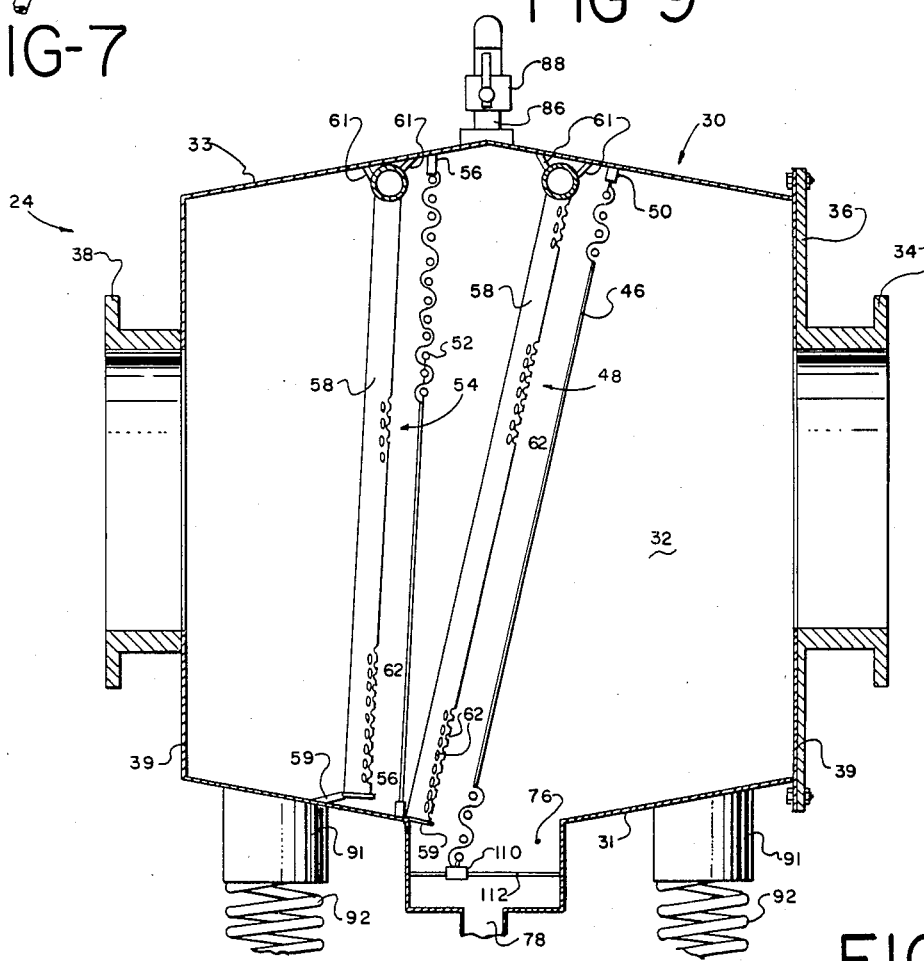

CIRCULATING WATER FILTERING SYSTEM AND METHOD OF OPERATION

BACKGROUND OF THE INVENTION (1) Field of the Invention

This invention relates to the filtration of lake or pond water flowed at great rates to condensors of industrial plants.

(2) Description of the Prior Art

Certain large industrial processes, such as steam-operated electrical generating power plants, use great quantities of circulating water on a continuous basis. The circulating water is usually flowed through tubes of a condensor or heat exchanger to absorb heat from another fluid, such as steam. For example, a medium-sized power plant might require 250,000 gallons per minute of the circulating water (gpm) flowing through a ten foot diameter tunnel from a lake to the plant. Of course, for larger power plants, more circulating water is required.

Lakes or ponds used as sources of circulating water often contain fish, clams, and other water life. In certain areas, especially during warm, temperate periods, clams flourish and multiply in the lakes or ponds. Before my invention, small clams, and other particles were drawn into the power plant with the circulating water. Any clams or other particles larger than a maximum allowable particle size clog the condensor tubes used in the plant. Unclogging the tubes often requires shutting down the plant, at great expense.

Before my invention, it was commercial practice to use a traveling screen in the lake at the pump input. However, this solution to the clam clogging problem has been ineffective.

Before this application was filed, a search was made in the U.S. Patent and Trademark Office. That search developed the following U.S. patents:

| | |
|---|---|
| PETERSON | 211,640 |
| RONNINGEN ET AL | 2,828,017 |
| LIDDELL | 2,954,872 |
| LIDDELL | 3,056,499 |
| OBIDNIAK | 3,675,775 |
| KAISER | 3,976,577 |
| SCHAEFFER | 3,994,810 |

PETERSON shows that over 100 years ago, it was known to filter large volumes of water by using parallel filters. He also provided structure that could isolate each of the filters so one filter could be taken out of service at a time for cleaning or repair while the remaining filters were still operating.

LIDDELL U.S. Pat. Nos. 2,954,872 and 3,056,499 shows a series of three filters where any one of the three filters can be taken out of service and backwashed. LIDDELL apparently used full flow backwash by reversing the main flow through the filter and backwashing the filter with filtered water.

The other patents are considered pertinent because the applicant believes the Examiner would consider anything revealed by the search to be relevant and pertinent to the examination of this application.

SUMMARY OF THE INVENTION (1) New Functions and Surprising Results

I have solved the clogging problems associated with using pond or lake water in steam power plants. My invention filters the clams and other undesired particles from the circulating water as it is pumped to the plant from the lake or pond.

My invention has at least three, and preferably four or more large capacity filter units connected in parallel between the plant and the lake. Inlets and outlets of the filter units are fluidly connected in parallel through tunnels to the lake and the plant intake, respectively.

It should be apparent that the filter units may eventually be subject to clogging problems as well. The parallel connection of the filter units permits each filter unit to be alternately isolated and backwashed or cleaned of clogging particles while the circulating water for the plant is filtered through the other unblocked nonisolated units.

Isolation of a filter unit provides an opportunity for maintenance in the form of inspection or repairs by workmen entering through manholes in the filter unit.

Therefore, my invention obtains the unexpected and surprising results of filtering clams and other undesired particles from circulating water with uninterrupted flow of great quantities of the circulating water, with my novel combination of pipes, screens, flanges, valves, etc.

The filter units each preferably have a primary screen and a secondary screen positioned in a unit interior. Apertures in the secondary screen are sized to pass only clams, shells, and other particles smaller than the allowable particle size, described above. I prefer to stage the filtration in each unit by using slightly larger apertures in the primary screen upstream from the secondary screen.

Thus, it may be seen that the function of the total combination far exceeds the sum of the functions of the individual elements, such as pipes, flanges, valves, etc.

(2) Objects of this Invention

An object of this invention is filtration of circulating water.

Further objects are to achieve the above with a device that is sturdy, durable, simple, safe, efficient, ecologically compatible, energy conserving, and reliable, yet relatively inexpensive and easy to manufacture, install, operate and maintain.

Other objects are to achieve the above with a method that is ecologically compatible, energy conserving, rapid, efficient, and relatively inexpensive, and does not require highly skilled people to install, operate, and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWING

FIG. 5 is a sectional view taken substantially along line 5—5 of FIG. 2.

FIG. 6 is a sectional view of a spray nozzle.

FIG. 7 is a sectional view of part of the primary screen.

FIG. 8 is a sectional view of part of the secondary screen.

FIG. 9 is an elevational view of part of the primary screen.

DESCRIPTION OF THE PREFERRED EMBODIMENT

To clearly illustrate my invention, this preferred embodiment is described in connection with a typical, exemplary power plant 10 requiring about 250,000 gallons per minute of circulating water. However, it will be understood that larger or smaller power plants, or other industrial processes continuously using such great quantities of circulating water, could employ my invention with appropriate modifications of the structure described herein.

A power plant as used herein refers to a steam operated electrical generating power plant, wherein circulating water from a lake is flowed through tubes of condensors. Heat is transferred to the circulating water from steam flowed through the condensor shells around the tubes. Those familiar with electrical power plants of this nature are aware of the substantial quantities of circulating water required for such condensors. For example, the tunnels for the power plant 10 can accommodate 300,000 gallons per minute (gpm), and are about ten feet in diameter. The steam power plant is a form of industrial plant or processes requiring great quantities of circulating water, such as in excess of 100,000 gallons per minute.

As used herein, the term downstream refers to the direction of flow of the circulating water through a filter unit when that unit is unblocked. Similarly, the term upstream refers to the direction against the flow of circulating water.

Figure 1:
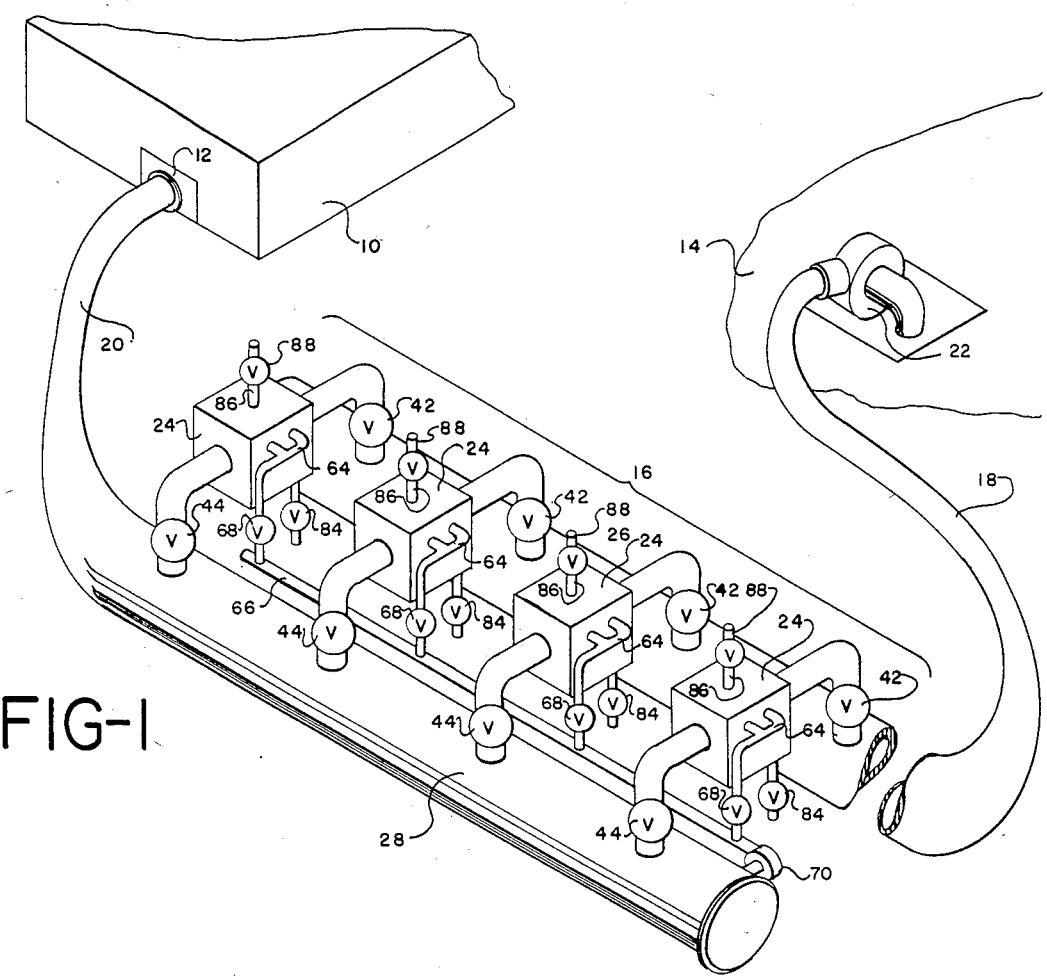
FIG. 1 is a schematic representation of a circulating water system according to my invention.

FIG. 1 schematically shows a system for supplying circulating water to the power plant 10 according to my invention. Appropriate modifications may be made in the described structure to accomodate larger plants, and still be within the scope of my invention. The system supplies circulating water to the plant 10 at circulating water plant intake 12 from a source of circulating water in the form of pond or lake 14. Other bodies of water could also serve as sources of circulating water.

The lake 14 and the plant intake 12 are connected to filter unit bank 16 by circulating water tunnels 18 and 20, respectively. The tunnels 18 and 20 form a tunnel fluidly connecting the source of the circulating water to the water intake 12 of the plant 10, with the bank 16 in the tunnel.

Circulating pump 22 in the tunnel 18 has a maximum capacity of 300,000 gallons of water per minute to satisfy the requirements of the power plant 10. Thus, the pump 22 forms pump means fluidly connected to the tunnel for flowing at least 100,000 gallons of circulating water per minute from the source through the tunnel to the water intake 12.

The filter unit bank 16 contains four filter units 24. It will be understood that at least three filter units are required for a circulating water supply system according to my invention, and that more than three or four units may be employed for various applications as needed. The reasons for multiple units will become apparent.

Bank manifold 26 forms the connection of the tunnel 18 to inlets of the units 24. The inlets of the units 24 are connected in parallel through the bank manifold 26 to the tunnel 18, thereby connecting the inlets of the units in parallel to the source of circulating water.

Likewise, bank manifold 28 forms the bank outlet connected to the tunnel 20. The outlets of the units 24 are fluidly connected in parallel through the bank manifold 28 to the tunnel 20, thereby connecting the outlets of the units 24 in parallel to the water intake 12 of the plant 10.

Figure 3:
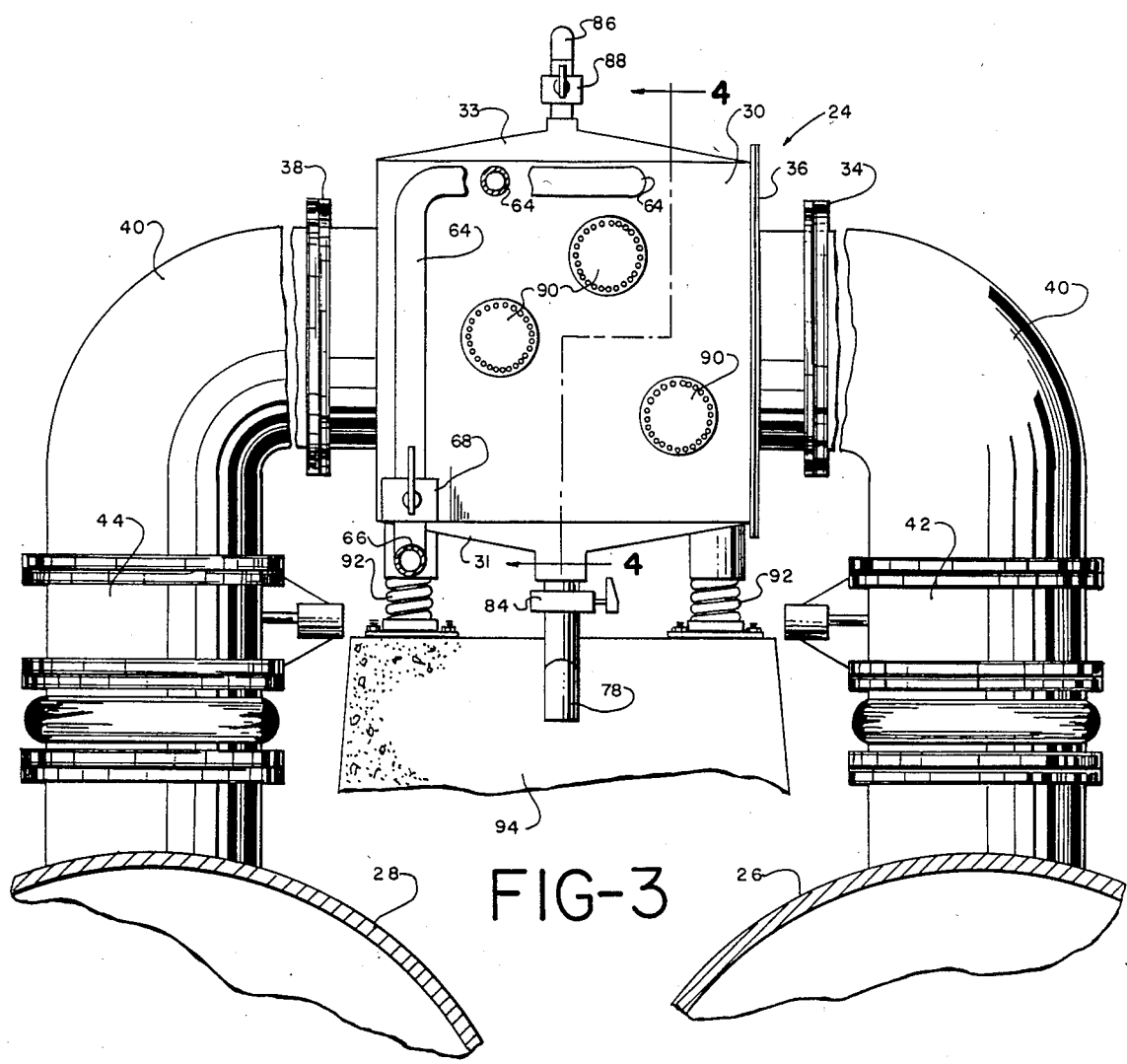
FIG. 3 is a sectional view taken substantially along line 3—3 of FIG. 2.

Referring to FIG. 3, each filter unit 24 has a somewhat cube-shaped unit body 30 having a unit interior 32. Inlet flange 34 is attached to inlet plate 36. The inlet plate 36 is rigidly attached to and forms an inlet unit end 39 of the unit body 30. Outlet flange 38 is attached to an outlet unit end 39 of the unit body opposite the inlet flange 34. For this embodiment, the flanges 34 and 38 are preferably five feet in diameter and are adapted to connect a pipe having a circular cross-section of five feet to the unit body 30.

Elbows 40 connect the flanges 34 and 38 to inlet valve 42 and outlet valve 44, respectively. The elbows 40 and valves 42 and 44 are about five feet in diameter. The valves 42 and 44 are preferably motorized butterfly valves for ease of operation and reliability under substantial flow rates.

Thus, it may be seen that the inlet valve 42, the elbow 40, and the inlet flange 34 form the filter unit inlet. Likewise, the outlet valve 44, the elbow 40, and the outlet flange 38 for the filter unit outlet. Additionally, the valves 42 and 44 form valve means for blocking the inlet and the outlet of each filter unit 24.

Each of the units 30 also has a primary screen 46 with primary apertures 48 therein supported in the unit interior 32 by screen supports 50, and secondary screen 52 having secondary apertures 54 therein and supported in the unit interior 32 by screen supports 56. The allowable particle size for the illustrative 250,000 gallon per minute power plant is about one-quarter inch. The secondary apertures 54 are about one-quarter inch in diameter, about the assumed allowable particle size. The primary apertures are preferably slightly larger than the allowable particle size, or, for example, about three-eighths inch. The outlet and the inlet of each unit 24 is fluidly connected through the apertures 48 and 54 in the screens in that unit.

The supports 50 and 56 are attached to unit bottom 31 and unit top 33 of the unit body 30, and provide for rigid placement of the screens in the unit interior 32. The screens are disconnectable at the supports for replacement and maintenance.

By decreasing the aperture size from the primary to the secondary screen, a sequential or staged filtering is accomplished. A substantial portion of the clams and other undesired particles are screened by the primary screen, with some smaller particles escaping through the larger primary apertures, and accumulating on the secondary screen after being blocked by the smaller secondary apertures 54. Thus, the filtering load for each unit 24 is distributed between two screens. Of course, a single screen could be employed, and still be within the scope of my invention. Additionally, more than two screens could be employed for an increased staged filtering effect, especially where the required unit is substantially larger than the units 24 illustrated herein.

In FIG. 5, the primary screen 46 is angled or tilted such that top 58 thereof is more proximate the inlet flange 34 than bottom 60 thereof. In other words the top of the primary screen is inclined upstream of the bottom. This angling or tilted orientation permits heavier particles to fall toward the bottom of the unit interior 32 and away from the primary screen. Tilting of the secondary screen 52 is not as beneficial, since the particles and clams collected thereon will ordinarily be light enough that the water flow will keep them in place on the screen.

Figure 4:
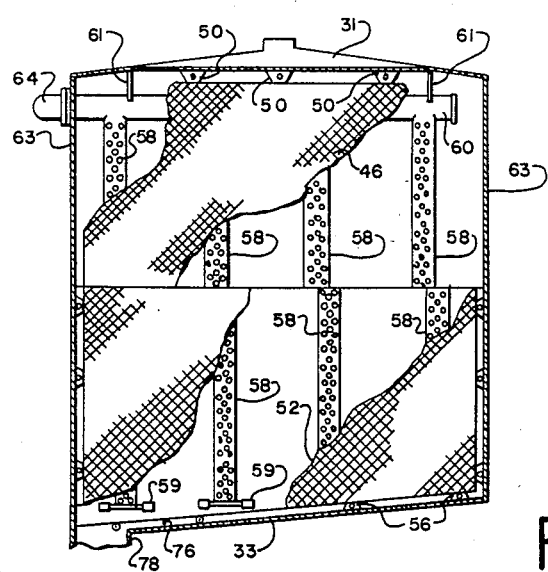
FIG. 4 is a sectional view taken substantially along line 4—4 of FIG. 3.

Referring again to FIGS. 4 and 5, a sprayer is positioned downstream and proximate each of the screens within each of the units 24. Each sprayer is preferably in the form of four spray tubes 58 spaced parallel to and coplanar with each other, and positioned downstream, proximate, and parallel-planar its respective screen. Sprayer manifold 60 connects ends of the spray tubes 58. The sprayer tubes 58 are rigidly positioned in the unit interior 32 by sprayer supports 59 connected to the unit bottom 31. The sprayer manifold is structurally connected to the unit top 33 by support 61 at one end, and to unit side 63 where the manifold extends through the side 63 to outside the unit body 30, as shown in FIG. 4.

A plurality of nozzles 62 are on each sprayer, preferably on the sprayer tubes 58, and are oriented toward the respective screen 46 or 52 upstream therefrom. The nozzles are adapted to emit a stream or spray of backwash water toward and against there respective screen when backwash water under pressure is introduced into the sprayer tubes 58. The nozzles are oriented upstream and spaced on the tubes 58 so that backwash water spray will be directed full force against the screens sufficient to dislodge any clams or particles collected on the screen surface or in any apertures therein. It will be noted that the sprayer tubes 58 are closed at the end opposite the sprayer manifold.

The preferred nozzle shown in FIG. 6 has the advantage of simple construction for lower maintenance and manufacturing costs. Other various nozzles could be employed with my invention, so long as they provide a sufficient stream of water under desired operating pressures in the sprayer tubes to project or direct a stream or spray of the backwash water against the screens to dislodge clams and foreign particles from the upstream side of the screens.

As noted above, the sprayer manifolds 60 extend from the sprayer tubes 58 through the side of the unit body 30 of each filter unit 24. The ends of the sprayer manifolds 60 for each unit are connected to backwash manifold 64 of each filter unit 24. The end of the backwash manifold 64 opposite the sprayer manifold 60 for each unit 24 is connected to backwash line 66. The backwash line connects the backwash manifolds 64 to a source of backwash water.

Backwash valve 68 in each backwash manifold 64 provides means for blocking each unit from the flow of backwash water through the backwash line 66. The preferred source of backwash water is the circulating water in the bank manifolds 26 or 28. Backwash pump 70 in backwash line 66 pumps backwash water from the bank manifold 26 to the nozzles 62 through the backwash line, and respective backwash manifold, backwash valve, sprayer manifold, and sprayer tubes. Backwash screen 72 and strainer 74 prevent entry of particles that might clog the backwash apparatus or nozzles. Check valve 75 in the backwash line prevents flow from the line 66 back into the pump 70.

The backwash valves 66 are preferably air controlled valves. The backwash valves collectively form means for selecting the sprayers of the unit to which the backwash water is to be directed when pumped by the backwash pump 70 from the bank manifold 26 or 28 through the backwash line 66, backwash manifold 64, sprayers, and nozzles 62.

The unit bottom 31 of each unit 24 forms drain channel 76. The drain channel is connected to disposal by drain pipes 78. Drain valves 84 in the drain pipes 78 provide for sealing the drain, formed by the drain channel 76, the drain pipe 78 and the drain valve 84 of each unit 24, from the flow of circulating water when the inlet and outlet valves 42 and 44 are opened.

Referring to FIG. 5, the screen support 50 at the unit bottom 31 is mounted at 110 on structure 112.

Vents 86 in the unit top 33 of each unit 24 provide for fluid communication of the unit interior 32 with the atmosphere. This permits pressure equalization during draining of backwash water from the unit 24 thorugh the drain channel 76. Vent valves 88 in each vent 82 provide for sealing the vent from the flow of circulating water therethrough when the inlet and outlet valves are opened.

Manhole covers 90 in the units 24 cover manholes in the unit sides 63 that provide access by workmen to the unit interior 32 for maintenance. Maintenance includes both inspection and servicing of the structure within the unit interior 32. For instance, the nozzles 62 may become damaged, worn or clogged. The connections of the various manifolds and pipes and lines of the sprayer and backwash means may become disconnected or leak. Of course, maintenance may also be performed externally for the inlet and outlet valves 42 and 44, the elbows 40 and other major connections.

Substantial flow rates and temperature may induce considerable flexing of the pipes and tunnels, especially during opening and closing of the inlet and outlet valves 42 and 44. Therefore, I prefer to mount the unit bodies 30 on struts 91 with springs 92 thereunder, on and rigidly attached to concrete foundations 94 under each unit 24.

Figure 2:
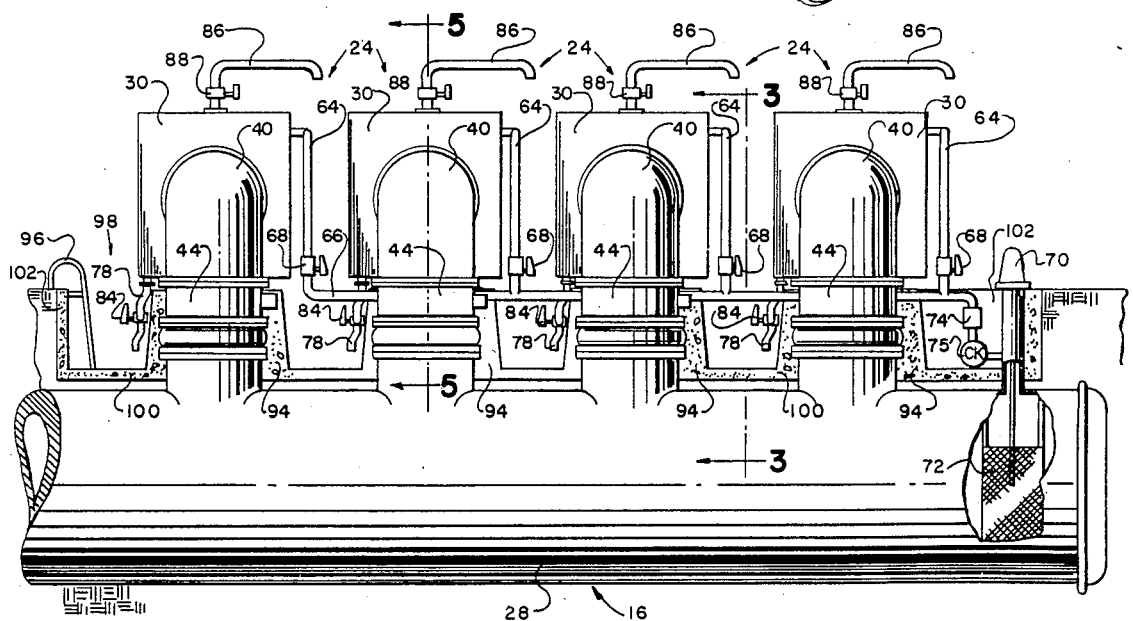
FIG. 2 is a side sectional view of a bank of filter units according to my invention.

FIG. 2 shows a preferred unit bank 16 construction and site, with the foundations 94 spaced along and between the underground tunnels 18 and 20. The backwash line 66 runs along one side of the foundations 94 to the pump 70. Ladder 96 provides access to the sunken service area 98, having a concrete floor 100 and walls 102.

Therefore, having described the structure above, the method of my invention may be seen to occur as follows. The circulating pump 22 flows the circulating water from the lake 14 through the bank manifold 26 to the inlets of the filter units 24. One of the units 24 is selected for servicing, according to a regular schedule, or when it is determined that clogging of the screens is starting up substantially affect filter unit performance. The servicing operation is begun by isolating or blocking the selected unit 24, by closing its inlet and outlet valves 42 and 44. Once the motorized valves are closed, drain valve 84 and vent valve 88 of the selected unit are opened.

The circulating water trapped in the selected unit when the valves 42 and 44 were closed is allowed to drain out. Then, the backwash valve 68 of the selected unit 24, is opened, and the backwash pump 70 started. Backwash water from the bank manifold 26, filtered and strained, is pumped through the backwash means and through the nozzles 62 against the screens 46 and 52.

The backwash water sprayed against the screens will strike, and dislodge, clams and other particles collected on the screens, washing them to the drain channel 76. The water, clams, and particles are then drained through the drain pipes 78 to disposal. When the draining water appears to be satisfactorily free of clams and particles, the backwash pump 70 is stopped, and the backwash valve 68 is closed. After the backwash water stops draining through the drain pipe 78, the drain valve 84 is closed.

At this point, if desired, the manhole covers 90 may be removed and workmen may enter the unit interior 32 through the manholes to perform maintenance. It is preferable to leave the vent valve 88 open while workmen are working to provide as much fresh air as possible. After maintenance is performed, the workmen leave through the manholes, and the manhole covers 90 are replaced on the manholes.

The inlet valve 42 is then only partially opened, with the vent valve 88 open, to fill the unit 24 with circulating water from the unit inlet and bank manifold 26, while purging the air from the selected unit through the open vent 86. When water flows from the vent 86, the vent valve 88 is closed, and the inlet and the outlet valves 42 and 44 are fully opened to unblock the selected unit 24, and place it online with the nonisolated, nonselected filter units 24.

It will be understood that while the selected unit is blocked with the inlet and outlet valves thereof closed, the other three units 24 are unblocked and nonselected, and are filtering the circulating water therethrough. The filtered circulating water will exit through the bank manifold 28, and flow through the tunnel 20 to the water intake 12.

After the selected unit is placed online by opening the inlet and outlet, another, different unit is selected for servicing and/or maintenance, and the servicing steps outlined above beginning with closing the inlet and outlet valves 42 and 44 are repeated. The procedure is again repeated until each unit 24 has been selected from servicing and has been backwashed or maintained, as desired.

The embodiment shown and described above is only exemplary. I do not claim to have invented all the parts, elements or steps described. Various modifications can be made in the construction, material, arrangement, and operation, and still be within the scope of my invention.

The limits of the invention and the bounds of the patent protection are measured by and defined in the following claims. The restrictive description and drawing of the specific example above do not point out what an infringement of this patent would be, but are to enable the reader to make and use the invention.

As an aid to correlating the terms of the claims to the exemplary drawing, the following catalog of elements is provided:

| 10 | power plant | 59 | sprayer supports |
|----|----|----|----|
| 12 | water intake | 60 | sprayer manifolds |
| 14 | lake | 61 | sprayer supports |
| 16 | filter unit bank | 62 | nozzles |
| 18 | tunnel | 63 | unit sides |
| 20 | tunnel | 64 | backwash manifolds |
| 22 | circulating pump | 66 | backwash line |
| 24 | filter units | 68 | backwash valves |
| 26 | bank manifold | 70 | backwash pump |
| 28 | bank manifold | 72 | backwash screen |
| 30 | unit bodies | 74 | backwash strainer |
| 31 | unit bottoms | 75 | check valve |
| 32 | unit interiors | 76 | drain channel |
| 33 | unit tops | 78 | drain pipes |
| 34 | inlet flanges | 84 | drain valves |

-continued

| 36 | inlet plates | 86 | vents |
|----|----|----|----|
| 38 | outlet flanges | 88 | vent valves |
| 39 | unit ends | 90 | manhole covers |
| 40 | elbows | 91 | struts |
| 42 | inlet valves | 92 | springs |
| 44 | outlet valves | 94 | foundations |
| 46 | primary screens | 96 | ladder |
| 48 | primary apertures | 98 | service area |
| 50 | screen supports | 100 | floor |
| 52 | secondary screens | 102 | walls |
| 54 | secondary apertures | 110 | mounting |
| 56 | screen supports | 112 | structure |
| 58 | sprayer tubes | | |

I claim as my invention:

1. A system for supplying circulating water to an industrial plant involving,
   (a) a circulating water intake for the industrial plant including head exchangers,
   (b) the water intake being fluidly connected to tubes, having tube diameters, equal to that of the heat exchangers in said plant,
   (c) a tunnel adapted to fluidly connect the water intake to a source of the circulating water contained in a lake,
   (d) pump means fluidly connected to the tunnel operative to flow at least 100,000 gallons per minute of the circulating water from the lake through the tunnel and water intake to the heat exchangers;

wherein the improvement comprises:
   (e) at least three filter units connected in parallel, with
   (f) inlets of the filter units fluidly in communication with the lake through the tunnel,
   (g) an inlet valve in each unit inlet,
   (h) outlets of the filter units fluidly connected in parallel through the tunnel and the water intake to the heat exchanger tubes, and
   (i) an outlet valve in each unit outlet,
   (j) each filter unit also having an interior downstream of the inlet and upstream of the outlet,
   (k) a primary screen in the interior, and
   (l) a secondary screen in the interior downstream of the primary screen,
   (m) apertures in each secondary screen about the diameter of the heat exchanger tubes,
   (n) apertures in each primary screen larger than the apertures in the secondary screens,
   (o) the inlet and outlet of each unit fluidly connected through the apertures of the screens,
   (p) a secondary sprayer in each unit interior downstream of the secondary screen thereof,
   (q) a primary sprayer in each unit interior between the primary and secondary screens thereof,
   (r) each sprayer having at least two spray tubes somewhat parallel to the screen that is upstream from the spray tubes,
   (s) a spray manifold fluidly connecting one end of the spray tubes of each sprayer,
   (t) nozzles on each spray tube oriented upstream toward the screen immediately upstream from that spray tube,
   (w) a source of wash water,
   (v) backwash means on each unit for passing the wash water from the wash water source through the nozzles against the screens when the outlet and inlet are both blocked, including
   (w) a wash pipe fluidly connecting the spray manifolds of each unit to the source of wash water, (x) a wash pump fluidly connected to each of the wash pipes for pumping wash water under pressure from the source of wash water through each of the wash pipes to the nozzles, and
(y) a wash valve in each of the wash pipes for disconnecting and connecting the source of wash water and the spray manifolds of each unit,
(z) a drain on each unit for draining the wash water, and particles washed off the screens,
(aa) a valve in each drain for blocking that drain,
(bb) a vent on each unit fluidly connecting the unit interior to atmosphere,
(cc) a valve in each vent for blocking that vent,
(dd) each of the filter units having a manhold therein through which a workman may enter the filter interior, and
(ee) a manhole cover over each of the manholes,
(cc) a concrete foundation on ground beneath each filter unit,
(gg) springs mounting the filter units to the concrete foundations to accommodate flexing of the tunnels and filter units.

2. A process involving a system for supplying circulating water to industrial processes having
(a) a circulating water intake for the industrial plant including heat exchangers,
(b) the water intake being fluidly connected to tubes, having tube diameters, equal to that of the heat exchangers in said plant,
(c) a tunnel adapted to fluidly connect the water intake, to a source of circulating water contained in a lake,
(d) pump means fluidly connected to the tunnel operative to flow at least 100,000 gallons per minute of the circulating water from the lake through the tunnel and water intake to the heat exchangers;
wherein the improved method for removing the particles comprises the steps of:
(e) flowing the circulating water from the lake to inlets of a plurality of filter units connected in parallel, through at least two serially spaced apart screens in each of the units, and from outlets of the units through the circulating water intake to the heat exchanger tubes; while
(f) isolating a selected filter unit of the filter units from the circulating water flow by
(g) blocking the inlet of the selected unit and
(h) blocking the outlet of the selected unit, then while the selected unit is isolated from the circulating water flow,
(i) draining circulating water from the selected filter unit through a drain in the unit, then
(j) fluidly connecting a source of wash water under pressure to a sprayer between the screens and to a sprayer downstream of both screens in the selected unit,
(k) spraying wash water upstream against one of the screens from the sprayer between the screens in the selected unit, and
(l) spraying wash water upstream against the other screen from the sprayer downstream of both screens in the selected unit, while
(m) washing particles collected on each screen to a bottom of the selected unit,
(n) draining the wash water and the particles from the bottom of the selected filter unit, and
(o) inspecting the draining wash water, then
(p) disconnecting the source of wash water from the sprayers when the wash water draining from the selected unit appears free from particles, and
(q) closing the drain, then
(r) partially opening the selected unit inlet, and
(s) opening a vent in a top of the selected unit, then
(t) flowing circulating water into the selected unit through the unit inlet while
(u) expelling air from the selected unit through the vent, then
(v) closing the vent when the selected unit is filled with circulating water, then
(w) fully opening the inlet of the selected unit and
(x) fully opening the outlet of the selected unit, thereby
(y) reconnecting the inlet and outlet of the selected filter unit to the circulating water flow; then
(z) repeating the above servicing steps "(g)" through "(z)" for a different selected unit of the filter units until all filter units have been backwashed,
(aa) removing a manhole cover from over a manhole in one of the filter units, while the inlet and the outlet of the filter unit are blocked, then having a workman
(bb) entering the unit interior through the manhole, then having said workman
(cc) manipulate structure within the unit interior, while inside, then having said workman
(dd) leave the unit through the manhole, then
(ee) replace the manhole cover,
(ff) the filter units being mounted on concrete foundation by flexible springs so as to accomodate flexing of the tunnels and filter units when responding to changes in circulating water flow therethrough.

3. A system for supplying circulating water to an industrial plant involving,
(a) a circulating water intake for the industrial plant including tube heat exchangers,
(b) the water intake being fluidly connected to tubes, having tube diameters, equal to that of the heat exchangers in said plant,
(c) a tunnel adapted to fluidly connect the water intake to a source of circulating water contained in a lake,
(d) pump means fluidly connected to the tunnel operative to at least 100,000 gallons per minute of the circulating water from the lake through the tunnel and water intake to the heat exchangers;
wherein the improvement comprises:
(e) at least three filter units connected in parallel, with
(f) inlets of the filter units in communication with the lake through the tunnel,
(g) an inlet valve in each unit inlet,
(h) outlets of the filter units fluidly connected in parallel through the tunnel and the water intake to the heat exchanger tubes, and
(i) an outlet valve in each unit outlet,
(j) each filter unit also having an interior downstream of the inlet and upstream of the outlet,
(k) a primary screen in the interior, and
(l) a secondary screen in the interior downstream of the primary screen,
(m) apertures in each secondary screen about the diameter of the heat exchanger tubes,
(n) apertures in each primary screen larger than the apertures in the secondary screens,
(o) the inlet and outlet of each unit fluidly connected through the apertures of the screens, (p) a secondary sprayer in each unit interior downstream of the secondary screen thereof,
(q) a primary sprayer in each unit interior between the primary and secondary screens thereof,
(r) each sprayer having at least two spray tubes somewhat parallel to the screen that is upstream from the spray tubes,
(s) a spray manifold fluidly connecting one end of the spray tubes of each sprayer,
(t) nozzles on each spray tube oriented upstream toward the screen immediately upstream from that spray tube,
(u) a source of wash water,
(v) backwash means on each unit for passing the wash water from the wash water source through the nozzles against the screens when the outlet and inlet are both blocked, including
(w) a wash pipe fluidly connecting the spray manifolds of each unit to the source of wash water,
(x) a wash pump fluidly connected to the wash pipe for pumping wash water under pressure from the source of wash water through the wash pipe to the nozzles, and
(y) a wash valve in the wash pipe for disconnecting and connecting the source of wash water and the spray manifolds of each unit,
(z) a drain on each unit for draining the wash water, and particles washed off the screens,
(aa) a valve in each drain for blocking that drain,
(bb) a vent on each unit fluidly connecting the unit interior to atmosphere,
(cc) a valve in each vent for blocking that vent,
(dd) each of the filter units having a manhole therein through which a workman may enter the filter interior, and
(ee) a manhole cover over the manhole
(ff) the screens each having a top and a bottom,
(gg) the primary screens each being inclined to the circulating water flow with the top more upstream than the bottom,
(hh) the secondary screens each being somewhat normal to the circulating water flow,
(ii) the apertures in the secondary screens being about one-quarter inch diameter,
(jj) the apertures in the primary screens being larger than one-quarter inch diameter, and
(kk) a traveling filter screen associated with the tunnel at its connection to the lakes,
(ll) a concrete foundation on ground beneath each filter unit,
(mm) springs mounting the filter units to the concrete foundations to accommodate flexing of the tunnels and filter units.

* * * * *